(12) United States Patent
Sano et al.

(10) Patent No.: US 7,859,768 B2
(45) Date of Patent: Dec. 28, 2010

(54) OPTICAL ELEMENT AND OPTICAL APPARATUS

(75) Inventors: Daisuke Sano, Utsunomiya (JP); Takeharu Okuno, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 12/446,713

(22) PCT Filed: Jul. 24, 2008

(86) PCT No.: PCT/JP2008/063716

§ 371 (c)(1),
(2), (4) Date: Apr. 22, 2009

(87) PCT Pub. No.: WO2009/017182

PCT Pub. Date: Feb. 5, 2009

(65) Prior Publication Data

US 2010/0091376 A1    Apr. 15, 2010

(30) Foreign Application Priority Data

Jul. 27, 2007   (JP) .............................. 2007-196745

(51) Int. Cl.
G02B 3/00    (2006.01)
G02B 5/18    (2006.01)
G02B 1/10    (2006.01)

(52) U.S. Cl. ..................... 359/722; 359/569; 359/580; 359/581

(58) Field of Classification Search ................. 359/569, 359/580, 581, 619, 620, 625, 626, 722
See application file for complete search history.

(56) References Cited

U.S. PATENT DOCUMENTS 4,013,465 A     3/1977   Clapham et al. ................ 96/36
5,337,183 A *   8/1994   Rosenblatt .................. 359/248
7,542,197 B2 *  6/2009   Ishii et al. .................... 359/290
7,595,927 B2 *  9/2009   Ishii et al. .................... 359/291
2006/0199040 A1  9/2006   Yamada et al. ............... 428/701

(Continued)

FOREIGN PATENT DOCUMENTS

JP          5-70040 A        6/1975

(Continued)

OTHER PUBLICATIONS

International Search Report and Written Opinion in PCT/JP2008/063716, (Nov. 4, 2008).

*Primary Examiner*—David N Spector
(74) *Attorney, Agent, or Firm*—Fitzpatrick, Cella, Harper & Scinto

(57) ABSTRACT

The optical element includes in order from a light-entering side, a first layer (012), a second layer (013), and a base member (011). The first layer includes a concavo-convex structure with convex portions (012a) and concave portions (012b) alternately formed at a pitch smaller than a wavelength $\lambda$ of entering light, and the second layer satisfies the following conditions:

$$\sqrt{nb \cdot ns} - 0.15 \le nA \le \sqrt{nb \cdot ns} + 0.10$$

$$\frac{\lambda}{8 \cdot nA} \le dA \le \frac{\lambda}{nA}$$

where ns represents an effective refractive index of the first layer, nb represents a refractive index of the base member, and nA and dA respectively represent a refractive index and a thickness of the second layer.

9 Claims, 9 Drawing Sheets

U.S. PATENT DOCUMENTS

| | | | |
|---|---|---|---|
| 2009/0081361 A1 | 3/2009 | Yamada et al. | 427/162 |
| 2009/0185275 A1* | 7/2009 | Liu et al. | 359/586 |
| 2009/0190202 A1* | 7/2009 | Moidu et al. | 359/291 |
| 2010/0053760 A1* | 3/2010 | Uchida et al. | 359/601 |
| 2010/0118404 A1* | 5/2010 | Endoh et al. | 359/569 |

FOREIGN PATENT DOCUMENTS

| | | |
|---|---|---|
| JP | 5-27102 A | 2/1993 |
| JP | 3135944 B2 | 2/2001 |
| JP | 2004-284178 A | 10/2004 |
| JP | 2006-259711 A | 9/2006 |

* cited by examiner

OPTICAL ELEMENT AND OPTICAL APPARATUS

TECHNICAL FIELD

The present invention relates to an optical element having optical functions such as a reflection suppressing (reflection reducing) function, and also relates to an optical apparatus using the same.

BACKGROUND ART

Many optical apparatuses use various transmissive optical elements. For example, an imaging optical system of a digital camera uses lenses as the transmissive optical elements to form an object image on an image-pickup element.

However, optical glass and optical plastic generally used as materials of the transmissive optical elements have a large refractive index, thereby having a large reflectance. Therefore, use of a plurality of such transmissive optical elements increases the amount of reflecting light, thus decreasing the amount of transmitting light.

In order to suppress the reflection by the transmissive optical element, the optical element is often provided with a reflection suppressing function. Some methods have been known as a method of providing an optical element with the reflection suppressing function.

The most common method is to form a reflection suppressing (antireflection) film on a surface of the transmissive optical element. More specifically, a thin film is formed on the surface of the transmissive optical element by a thin-film formation technology such as vapor deposition or sputtering, so as to reduce the reflectance by using optical interference.

Another method is to use a structure finer than an entering light wavelength (also called a use wavelength). As the most famous structure, a "moth-eye" structure is available. The moth-eye enables a very low reflectance due to its unique minute structure.

In the structure finer than the entering light wavelength, light is not affected by the structure, but shows a property as if it passed through a uniform medium. Such a structure shows a refractive index in accordance with a volume ratio of the materials constituting thereof. Thereby, a structure with a low refractive index can be achieved, which cannot be achieved by a normal material, thus favorably suppressing the reflection.

As the reflection suppressing method using the minute structure, a particle-dispersed film is applied in which minute particles with a diameter smaller than the entering light wavelength are dispersed (Japanese Patent No. 3135944), and a minute periodic structure is formed by a minute-pattern processing technique (Japanese Patent Laid-Open No. 50 (1975)-70040).

However, a complicated process is required for forming the structure finer than the entering light wavelength, and the degree of freedom of design is low because of the limitation of materials constituting thereof. Thus, high reflection suppressing performance can be achieved with such a minute structure only for a transmissive optical element in limited conditions.

The present invention provides an optical element having optical performance such as good reflection suppressing performance and having a high degree of freedom of design.

DISCLOSURE OF INVENTION

The present invention provides, according to an aspect thereof, an optical element including in order from a light-entering side, a first layer, a second layer, and a base member. The first layer includes a concavo-convex structure with convex portions and concave portions alternately formed at a pitch smaller than a wavelength λ of entering light, and the second layer satisfies the following conditions:

$$\sqrt{nb \cdot ns} - 0.15 \leq nA \leq \sqrt{nb \cdot ns} + 0.10$$

$$\frac{\lambda}{8 \cdot nA} \leq dA \leq \frac{\lambda}{nA}$$

where ns represents an effective refractive index of the first layer, nb represents a refractive index of the base member, and nA and dA respectively represent a refractive index and a thickness of the second layer.

The present invention provides, according to another aspect thereof, an optical apparatus including the above-described optical element.

Other aspects of the present invention will become apparent from the following description and the attached drawings.

BEST MADE FOR CARRYING OUT THE INVENTION

Exemplary embodiments of the present invention will hereinafter be described with reference to the accompanying drawings.

Figure 1:
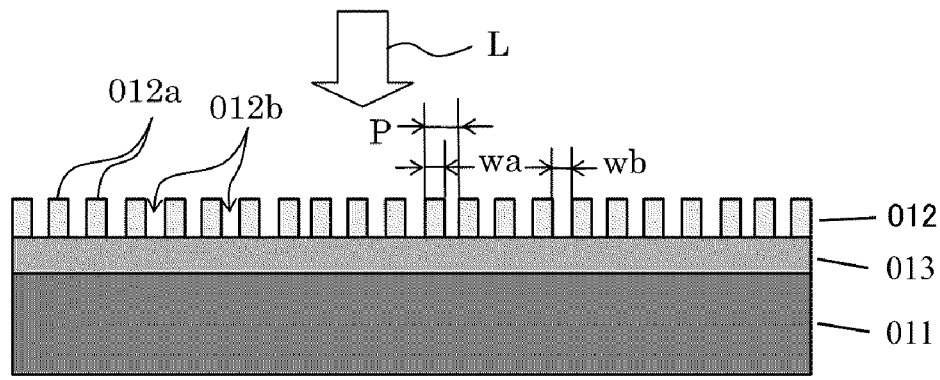
FIG. 1 schematically shows the structure of an optical element that is an embodiment of the present invention.

FIG. 1 shows the structure of an optical element that is an embodiment of the present invention. L represents light entering the optical element. The optical element includes a first layer 012, a second layer 013, and a base member 011 in order from a light-entering side.

The base member 011 corresponds to an optically transparent member (transmissive optical member) such as a lens or a prism, to which a reflection suppressing function is provided by the first and the second layers 012 and 013.

The first layer 012 has a concavo-convex structure including convex portions 012a and concave portions 012b alternately formed at a pitch p smaller than a wavelength λ of the light L entering the optical element. The convex portion 012a and the concave portion 012b have widths wa and wb, respectively. The pitch p referred to herein is a length from one convex portion 012a to the next convex portion 012a. The width of each of the convex portion 012a and the concave portion 012b referred to herein is a dimension in an alternate alignment direction of the convex portions 012a and the concave portion 012b.

The first layer 012 has the concavo-convex structure including the convex portions 012a and the concave portions 012b with uniform widths in a thickness direction of the first layer 012.

The second layer 013 is a homogeneous layer without a concavo-convex structure, which is disposed between the first layer 012 and the base member 011. Herein, the pitch p of the concavo-convex structure forming the first layer 012 preferably is equal to or more than λ/20, because the first layer 012 can serve as a layer with an effective refractive index obtained by mixing a medium constituting the convex portions 012a and a medium (e.g., air) filling the concave portions 012b.

The concavo-convex structure preferably is a periodic structure including the convex portions 012a and the concave portions 012b, each having a uniform width and being arranged regularly (i.e., the convex portions and the concave portions are formed alternately at the same pitch). However, if the average pitch is smaller than λ, a non-periodic structure with the convex portions 012a and the concave portions 012b arranged irregularly also is employable.

FIG. 1 shows only one layer as the second layer 013. However, two or more layers may be disposed as the second layer.

The second layer 013 may have a concavo-convex structure with convex portions and concave portions alternately formed at a pitch smaller than λ, instead of the above-described homogeneous layer.

Figure 2:
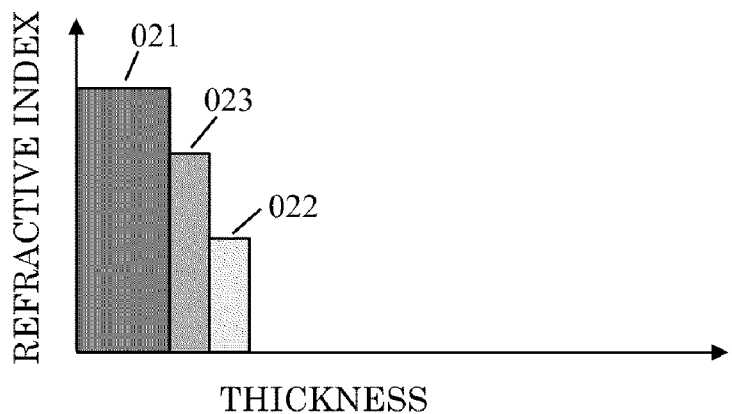
FIG. 2 illustrates a refractive-index structure of the optical element shown in FIG. 1.

FIG. 2 shows a refractive-index structure of the optical element shown in FIG. 1. In FIG. 2, reference numeral 021 denotes a refractive index of the base member 011, 022 denotes a refractive index (effective refractive index) of the first layer 012, and 023 denotes a refractive index of the second layer 013. The vertical axis of FIG. 2 represents a refractive index and the horizontal axis represents a position in the thickness direction.

Since the first layer 012 has a concavo-convex structure sufficiently smaller than the wavelength of the entering light L, it apparently shows optical characteristics like that of a homogeneous layer. More specifically, the first layer 012 has an effective refractive index obtained from a filling factor ff of materials constituting the convex portions 012a.

The effective refractive index ns can be roughly represented by the following Expression (a), where the refractive index of the material constituting the convex portions 012a is $n_0$:

$$n_s = \{ff^* n_0^2 + (1-ff)\}^{1/2} \tag{a}$$

As can be seen from Expression (a), a larger filling factor of the material constituting the convex portions 012a increases the effective refractive index of the first layer 012. Using this property enables formation of a low-refractive index layer which cannot be obtained in the conventional homogeneous layer.

The optical element of the present embodiment has a structure such that, between the first layer 012 and the base member 011, another layer generating optical interference (second layer 013) is inserted. This structure can lower the refractive index of the first layer 012 as the outermost layer, thus suppressing a change in Fresnel coefficient with respect to an incident angle of the entering light. Further, the optical interference generated at the second layer 013 can improve incident angle characteristics.

Further, a difference in refractive index between the first layer 012 as the outermost layer and air contacting therewith can be made smaller, thus making it possible to reduce amplitude of an optical interference wave, and therefore a reflection suppressing function excellent in broadband characteristics can be obtained.

In order to obtain the above-stated performance and function, the following conditions (1) and (2) have to be satisfied. In the following conditions (1) and (2), the refractive index and the thickness (also called the film thickness) of the second layer 013 are respectively represented by nA and dA, the wavelength of the entering light is represented by λ, the refractive index of the base member 011 is represented by nb, and the effective refractive index of the first layer 012 is represented by ns.

$$\sqrt{nb \cdot ns} - 0.15 \leq nA \leq \sqrt{nb \cdot ns} + 0.10 \tag{1}$$

$$\frac{\lambda}{8 \cdot nA} \leq nA \leq \frac{\lambda}{nA}. \tag{2}$$

More preferably, the following conditions (3) and (4) are satisfied:

$$\sqrt{nb \cdot ns} - 0.10 \leq nA \leq \sqrt{nb \cdot ns} + 0.07 \tag{3}$$

$$\frac{\lambda}{5 \cdot nA} \leq nA \leq \frac{\lambda}{2 \cdot nA}. \tag{4}$$

When satisfying these conditions, the optical interference at the second layer 013 can further reduce the reflection of the light whose incident angle characteristics and broadband characteristics have been corrected by the first layer 012, thus obtaining a high-performance reflection suppressing structure. Further, the satisfaction of the above conditions enables formation of a reflection suppressing structure with a high freedom degree of design which is applicable to a variety of types of transmissive optical members only by adjusting the refractive index and the thickness of the second layer 013.

Figure 5:
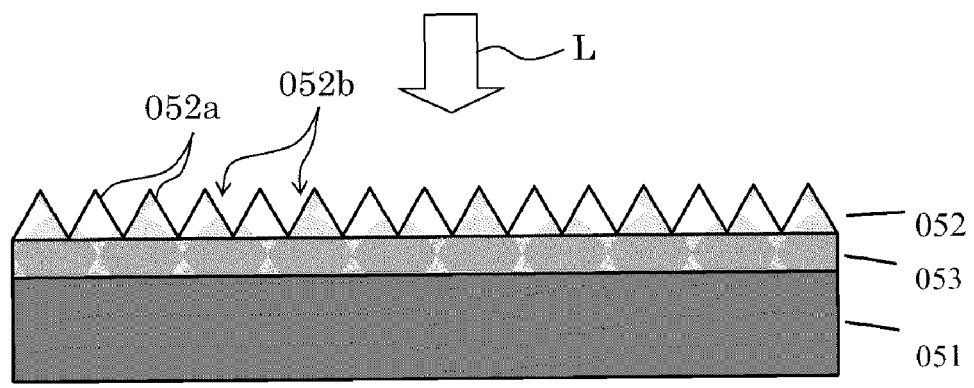
FIG. 5 schematically shows the structure of an optical element that is another embodiment of the present invention.

In an optical element having a structure similar to that of the optical element shown in FIG. 1, the concavo-convex structure provided in the first layer may be one shown in FIG. 5. Reference numeral 051 denotes a base member, and 052 denotes a first layer having a concavo-convex structure such that convex portions 052a and concave portions 052b are alternately formed at a pitch smaller than the wavelength λ of the entering light L.

The widths of the convex portions 052a and the concave portions 052b, however, vary in the thickness direction of the first layer 052. More specifically, the width of convex portions 052a increases with increasing proximity to the second layer 053 and the base member 051, whereas the width of the concave portions 052b changes in the opposite manner thereto. Reference numeral 053 denotes a second layer, which is a homogeneous layer.

Figure 6:
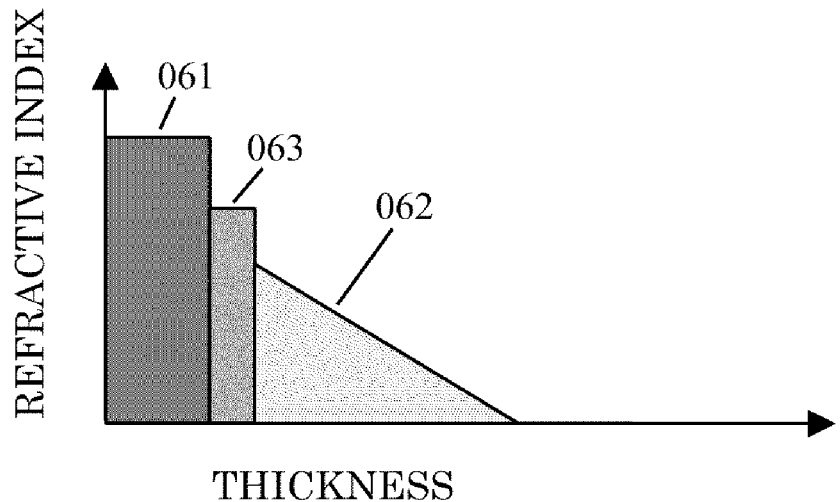
FIG. 6 shows a refractive-index structure of the optical element shown in FIG. 5.

The effective refractive index of the first layer 052 in this case changes in the thickness direction, which is shown in FIG. 6. Reference numeral 061 denotes a refractive index of the base member 051, 062 denotes a refractive index (effective refractive index) of the first layer 052, and 063 denotes a refractive index of the second layer 053. The vertical axis of FIG. 6 represents a refractive index and the horizontal axis represents a position in the thickness direction.

Since the convex portion 052a of the first layer 052 has a tapered shape getting thinner from a second layer side, so that the effective refractive index thereof gradually decreases from the second layer side toward an air side (light-entering side).

In such a refractive-index structure, the entering light interferes many times in the first layer 052 and then enters the second layer 053. In this case, unlike the conventional optical interference film, the light is attenuated in accordance with a gradient of the refractive index and the thickness of the first layer 052 to enter the second layer 053. Thus, in order to suppress reflection of remaining light at the base member 051, adjusting the refractive index and the thickness of the second layer 053 enables formation of a reflection suppressing structure excellent in optical characteristics.

As described above, the reflection suppressing structure of the present embodiment can attenuate light without using the conventional optical interference. Since the optical interference is sensitive to the thickness and the refractive index of a layer, the optical interference makes it difficult to realize a reflection suppressing structure excellent in broadband characteristics and incident angle characteristics. In contrast, the structure of the present embodiment is insensitive to the incident angle and the wavelength of the entering light, thus making it possible to easily realize a high-performance reflection suppressing structure.

Further, in the present embodiment, using the second layer suitable for the first layer structure enables formation of a reflection suppressing structure which is applicable to various transmissive optical members irrespective of a material and a shape of the first layer. Moreover, in the present embodiment, the light attenuated at the first layer enters the second layer, and therefore the structure of the present embodiment is insensitive to the refractive index and the thickness of the second layer as compared with a case using the conventional optical interference film. Therefore, the optical element of the present embodiment has a larger margin in manufacturing accuracy as compared with the conventional ones.

Figure 20:
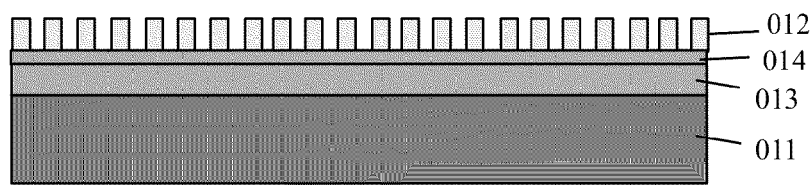
FIG. 20 schematically shows the structure of an optical element that is still another embodiment of the present invention.

Moreover, as shown in FIG. 20, another layer (a third layer) 014 satisfying the following condition (5) may be inserted between the second layer 013 and the first layer 012 satisfying the conditions (1) and (2) or the conditions (3) and (4):

$$0 < dB \le \frac{\lambda}{5 \cdot nB} \quad (5)$$

where nB and dB denote a refractive index and a thickness of the third layer.

The third layer 014 satisfying the condition (5) is so thin that the influence thereof on the optical characteristics of the optical element is small. However, the third layer 014 has an effect of improving adhesiveness between the first layer 012 and the second layer 013.

The first layer and a layer in contact therewith (the second layer in the structures shown in FIGS. 1 and 2 or the third layer, it is hereinafter referred to as an adjacent layer) may be made of mutually different materials. When the concavo-convex structure is formed at the pitch smaller than the wavelength λ of the entering light, a process for forming the concavo-convex shape generally follows a process for forming a homogeneous layer.

In this case, forming the first layer and the adjacent layer using mutually different materials can avoid or reduce damage of the adjacent layer caused by the concavo-convex shape processing. The mutually different materials may partially contain mutually the same material in their ingredients.

Figure 3:
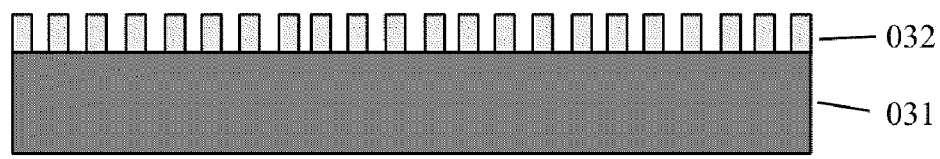
FIG. 3 schematically shows the structure of an optical element as a comparative example.
Figure 4:
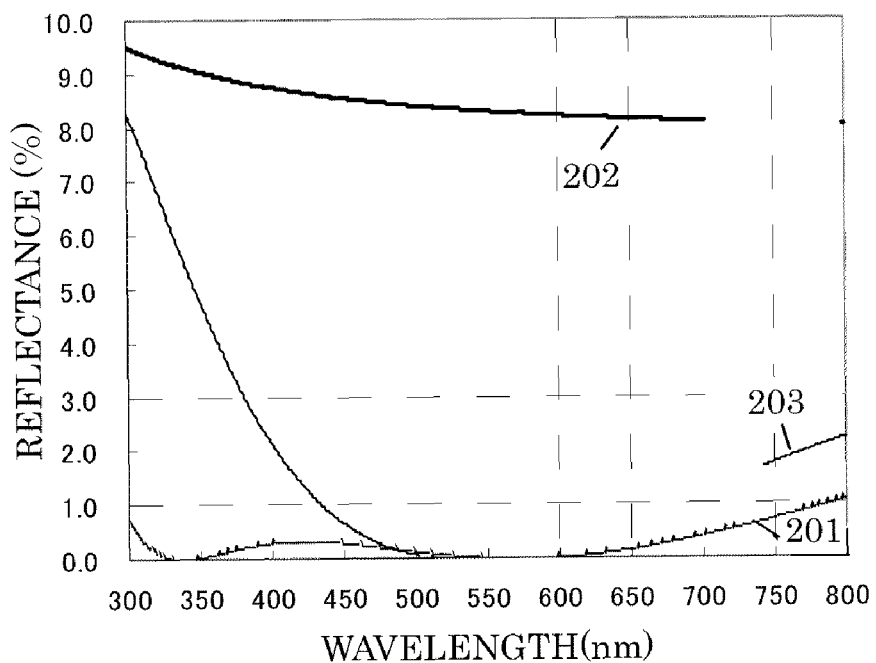
FIG. 4 shows reflection suppressing performance in the optical elements shown in FIGS. 1 and 3.

FIG. 3 shows an optical element as a comparative example including a first layer 032 having a concavo-convex structure with a uniform width in the thickness direction, the first layer 032 being directly formed on a base member 031 (i.e., it does not have a second layer). Even in this case, changing the structure of the first layer 032 can adjust the refractive index thereof. In this case, the structure satisfying the following condition (6) allows a reflectance characteristic as indicated by reference numeral 203 in FIG. 4. Reference numeral 202 in FIG. 4 denotes reflectance of the base member.

$$ns = \sqrt{nb} \quad (6)$$

However, the structure shown in FIG. 3 is equivalent to a single layer film, and therefore it has a narrow wavelength band and poor incident angle characteristics. In contrast, the structure shown in FIG. 1 can achieve good broadband reflection suppressing characteristics as indicated by reference numeral 201 shown in FIG. 4.

Although not shown in the figure, the structure shown in FIG. 5 can also achieve good broadband reflection suppressing characteristics, similarly to the structure shown in FIG. 1.

Figure 7:
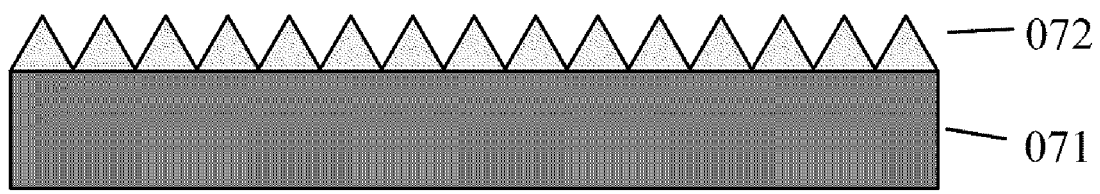
FIG. 7 schematically shows the structure of an optical element as another comparative example.
Figure 9:
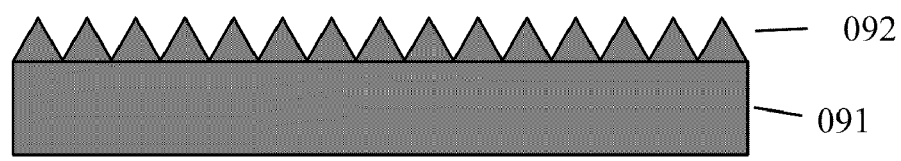
FIG. 9 schematically shows the structure of an optical element as still another comparative example.

FIGS. 7 and 9 show comparative examples having a first layer with its structure changing in a thickness direction. FIG. 7 shows a case where a base member 071 and the first layer 072 made of a material different from that of the base member 071 are adjacent to each other (without a second layer). FIG. 9 shows a case where a base member 091 and a first layer 092 made of the same material as that of the base member 091 are adjacent to each other (without a second layer).

Figure 8:
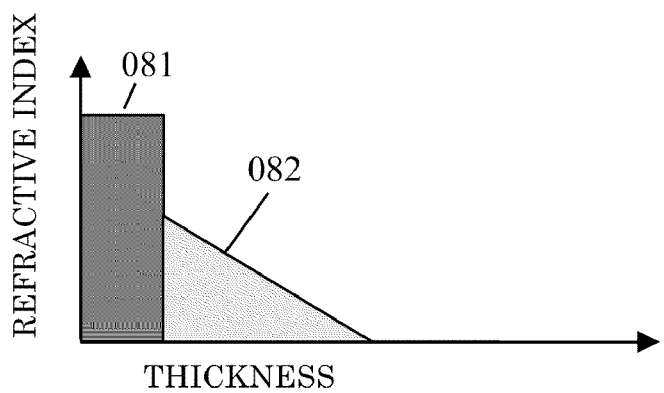
FIG. 8 shows a refractive-index structure of the comparative example shown in FIG. 7.

FIG. 8 shows a refractive-index structure of the structure shown in FIG. 7. Reference numeral 081 denotes a refractive index of the base member 071, and 082 denotes a refractive index (effective refractive index) of the first layer 072. In the structure shown in FIG. 7, since the first layer 072 and the base member 071 are made of mutually different materials, a large refractive index difference is generated at an interface therebetween. Therefore, even when the light entering from an air side is attenuated at the first layer 072, the light is reflected considerably at the interface between the first layer 072 and the base member 071, which reduces optical performance of the structure.

Figure 10:
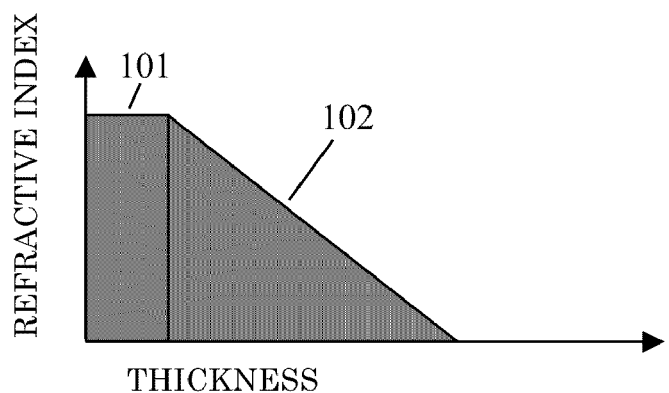
FIG. 10 shows a refractive-index structure of the comparative example shown in FIG. 9.

FIG. 10 shows a refractive-index structure of the structure shown in FIG. 9. Reference numeral 101 denotes a refractive index of the base member 091, and 102 denotes a refractive index (effective refractive index) of the first layer 092. In the structure shown in FIG. 9, since the first layer 092 and the base member 091 are made of the same material, the refractive index of the first layer 092 on a base member side is not so much different from the refractive index of the base member 091. Therefore, light entering the base member 091 is only attenuated light, which makes it possible to obtain good optical characteristics.

However, manufacturing of such a structure as the base member by using optical glass or optical plastic has difficulties and poor mass productivity. Additionally, the base member 091 has difficulties in processing itself depending on the shape thereof, which narrows a range of the shape of the base member 091 to which this structure is applicable.

Adjusting the material and the shape of the first layer 072 in the structure shown in FIG. 7 can also realize a refractive-index structure shown in FIG. 10. However, when such a structure is applied to a base member with a high refractive index exceeding 1.8, selection of the material and optimization of the structure are difficult, which causes difficulties in manufacturing and poor mass productivity.

Figure 11:
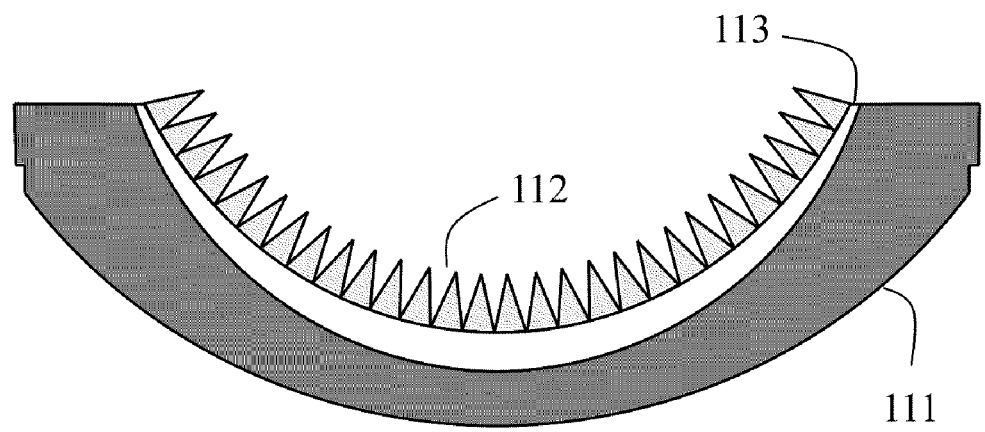
FIG. 11 shows an application example where the reflection suppressing structure of the embodiment is applied to a lens.
Figure 12:
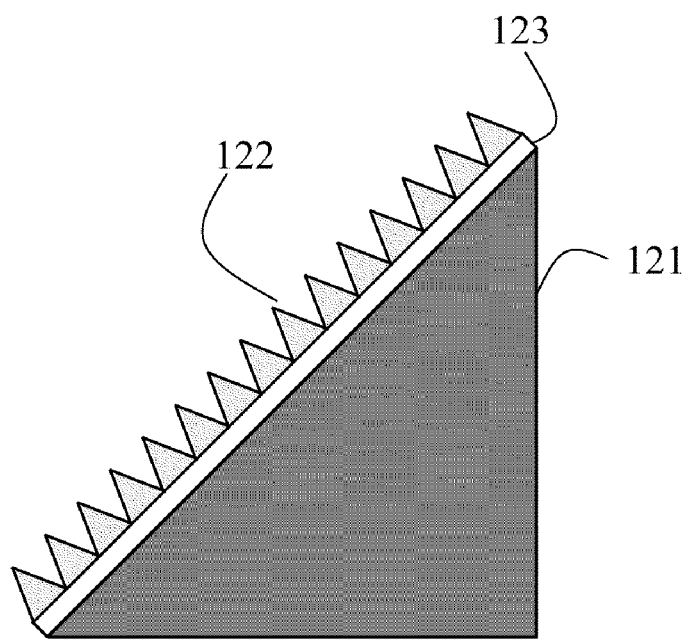
FIG. 12 shows an application example where the reflection suppressing structure of the embodiment is applied to a prism.

FIGS. 11 and 12 show application examples where the reflection suppressing structure described in the present embodiment is applied to optical elements. FIG. 11 is a cross sectional view of a lens which is one of the optical elements, and FIG. 12 is a cross sectional view of a prism which is another one of the optical elements.

In these figures, reference numerals 112 and 122 respectively denote a lens body and a prism body which are base members (optically transparent members) provided with a reflection suppressing function. Reference numerals 111 and 121 denote the first layer with the concavo-convex structure at the pitch smaller than the wavelength λ of the entering light. Reference numerals 113 and 123 denote the second layer.

The lens body 112 and the prism body 122 have a thickness large enough to be mounted to a general optical apparatus. The first layers 111 and 121 and the second layers 113 and 123 have a concavo-convex pitch and a thickness which are smaller than the wavelength λ of the entering light.

Figure 21:
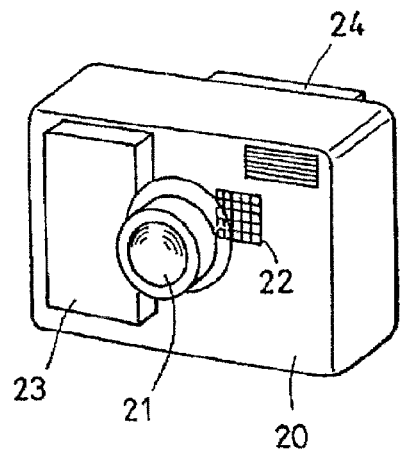
FIG. 21 schematically shows a digital camera using the optical element of the embodiment.

Such optical elements including the lens and the prism can be used in many optical apparatuses. For instance, FIG. 21 shows a digital camera which is one of the optical apparatuses using the optical element of the present embodiment.

Reference numeral 20 denotes a camera body, and 21 denotes an imaging optical system including the lens as the optical element of the present embodiment. The imaging optical system 21 includes plural lenses, at least one of which is the lens as the optical element of the present embodiment. Reference numeral 22 denotes a solid-state image-pickup element (photoelectric conversion element) such as a CCD sensor or a CMOS sensor that receives an object image formed by the imaging optical system 21, the solid-state image-pickup element 22 being provided in the camera body 20.

Reference numeral 23 denotes a memory to record therein image information corresponding to the object image, the image information being generated by photoelectrically converting the object image by the solid-state image-pickup element 22. Reference numeral 24 denotes an electronic viewfinder constituted by a liquid crystal display panel and the like, which enables observation of the object image formed on the solid-state image-pickup element 22.

In this way, constituting the imaging optical system using the optical element of the present embodiment can realize a camera with high optical performance which suppresses unnecessary reflection in the imaging optical system.

The optical element of the present embodiment may also be used for a viewfinder optical system of a camera, an illumination optical system and a projection optical system of a liquid crystal projector or the like. The optical element having the above-described reflection suppressing structure can sufficiently increase the amount of light transmitting therethrough and sufficiently suppress ghost or flare generated due to unnecessary reflection.

The following describes numerical examples (simulation examples) corresponding to the above-stated embodiment. Each comparative example employed 500 nm as the wavelength of the entering light. However, the wavelength of the entering light is not limited thereto in alternative embodiments (alternative numerical examples) of the present invention. Further, each numerical example employed physical layer thicknesses (film thicknesses) as the thicknesses of the layers.

Numerical Example 1

In an optical element of this numerical example, optical glass with a refractive index of 1.8 was used as the base member. Then, the second layer (homogeneous layer) with a refractive index of 1.46 was formed with a thickness of 95 nm on the base member, and the first layer was further formed with a thickness of 150 nm on the second layer. The first layer was made of a material with a refractive index of 1.46, and the material filling factor thereof was 30%. The effective refractive index of the first layer was 1.13. The first layer had a uniform structure in the thickness direction.

Figure 13:
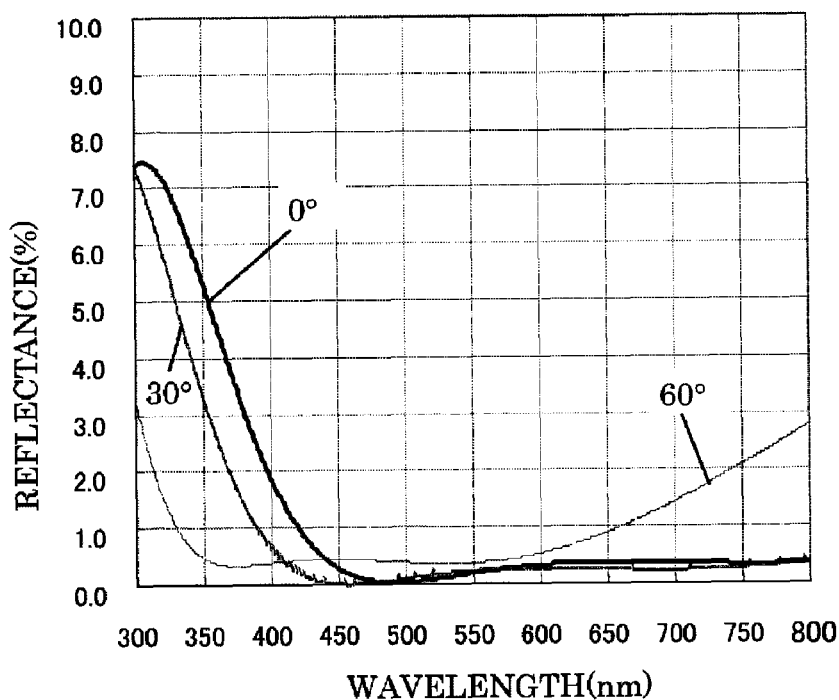
FIG. 13 shows reflectance characteristics of Numerical example 1 corresponding to the embodiment.

FIG. 13 shows characteristics of this numerical example. FIG. 13 shows reflectance characteristics for light whose incident angles are 0°, 30° and 60°.

This optical element showed significantly good reflection suppressing characteristics (low reflectances) at a low incident angle on a long wavelength side and at a high incident angle on a short wavelength side. Even when the incident angle is changed, the lowest reflectance was suppressed from being changed.

Numerical Example 2

In an optical element of this numerical example, optical glass with a refractive index of 1.5 was used as the base member. Then, the second layer (homogeneous layer) with a refractive index of 1.38 was formed with a thickness of 100 nm on the base member, and the first layer was further formed with a thickness of 100 nm on the second layer. The first layer was made of a material with a refractive index of 1.46, and the material filling factor thereof was 30%. The effective refractive index of the first layer was 1.13. The first layer had a uniform structure in the thickness direction.

Figure 14:
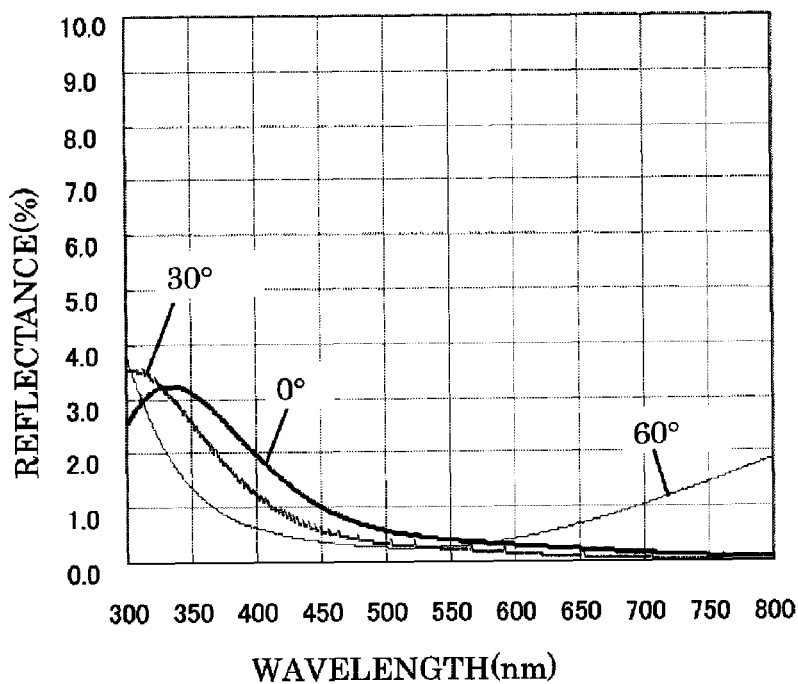
FIG. 14 shows reflectance characteristics of Numerical example 2.

FIG. 14 shows characteristics of this numerical example. FIG. 14 shows reflectance characteristics for light whose incident angles are 0°, 30° and 60°.

This optical element showed a broadband reflection suppressing characteristic especially at a high incident angle.

Numerical Example 3

In an optical element of this numerical example, optical glass with a refractive index of 1.8 was used as the base member. Then, the second layer was formed with a thickness of 85 nm on the base member, and the first layer was further formed with a thickness of 300 nm on the second layer. The second layer was made of a material with a refractive index of 1.68 and had the concavo-convex structure, and the material filling factor thereof was 90%. The effective refractive index of the second layer was 1.61. The first layer was made of a material with a refractive index of 1.53, and the material filling factor thereof at part closest to the base member was 70%. The effective refractive index of the first layer was 1.37.

The first layer was formed so that the filling factor decreased gradually with increasing proximity to the light-entering side.

Figure 15:
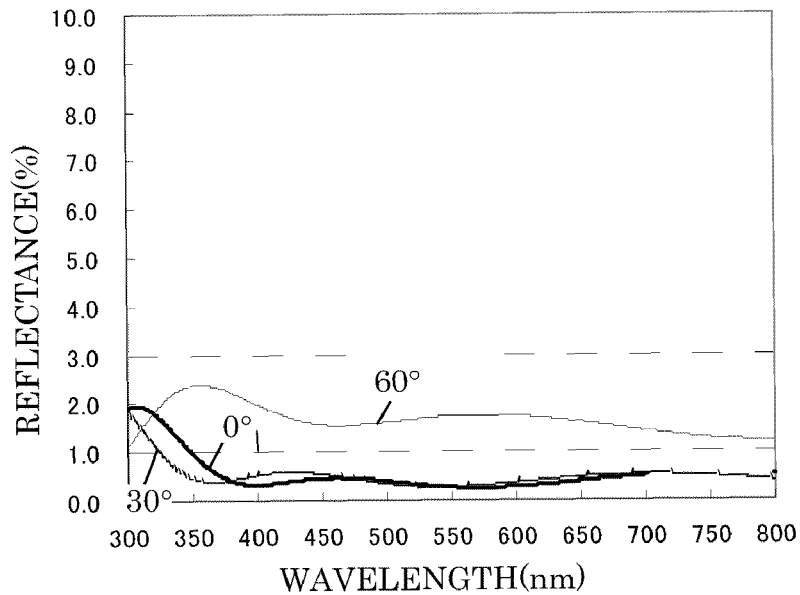
FIG. 15 shows reflectance characteristics of Numerical example 3.

FIG. 15 shows characteristics of this numerical example. FIG. 15 shows reflectance characteristics for light whose incident angles are 0°, 30° and 60°.

This optical element showed good reflection suppressing characteristics at a wide incident angle range from a low incident angle to a high incident angle. Further, it showed good broadband reflection suppressing characteristics at the entire incident angle range.

Numerical Example 4

In an optical element of this numerical example, optical glass with a refractive index of 1.8 was used as the base member. Then, the second layer (homogeneous layer) with a refractive index of 1.64 was formed with a thickness of 70 nm on the base member, the third layer (homogeneous layer) with a refractive index of 1.53 was formed with a thickness of 25 nm on the second layer, and the first layer was further formed with a thickness of 300 nm on the third layer. The first layer was made of a material with a refractive index of 1.53, and the material filling factor thereof at part closest to the base member was 70%. The effective refractive index of the first layer was 1.37. The first layer was formed so that the filling factor decreased gradually with increasing proximity to the light-entering side.

Figure 16:
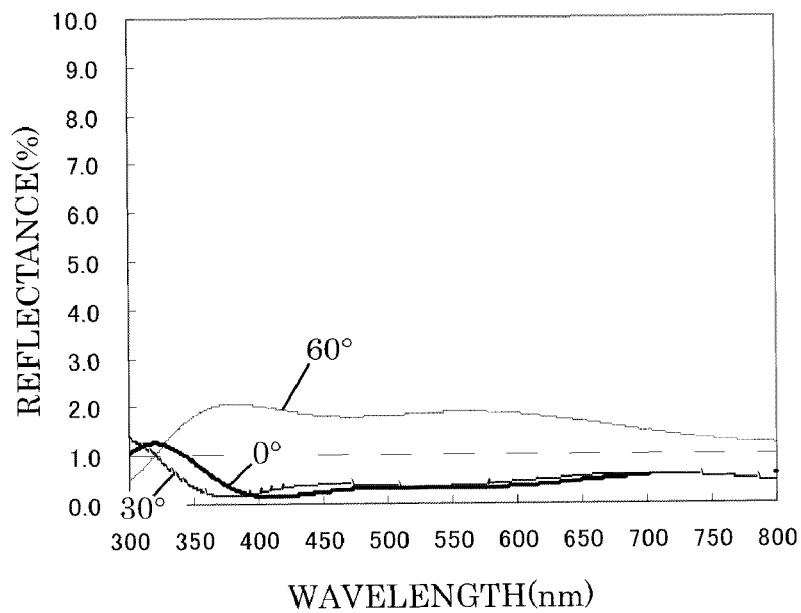
FIG. 16 shows reflectance characteristics of Numerical example 4.

FIG. 16 shows characteristics of this numerical example. FIG. 16 shows reflectance characteristics for light whose incident angles are 0°, 30° and 60°.

Since the influence of the interference at the third layer disposed between the first layer and the second layer was small in this optical element, a reflection suppressing structure excellent in incident angle characteristics and broadband characteristics was obtained.

The following describes comparative examples (simulation examples) in comparison with the above numerical examples. Each comparative example employed 500 nm as the wavelength of the entering light.

Comparative Example 1

In this comparative example, optical glass with a refractive index of 1.8 was used as the base member. Then, the first layer was formed with a thickness of 300 nm on the base member. The first layer was made of a material with a refractive index of 1.46, and the material filling factor thereof was 30%. The effective refractive index of the first layer was 1.13. The first layer had a uniform structure in the thickness direction.

Figure 17:
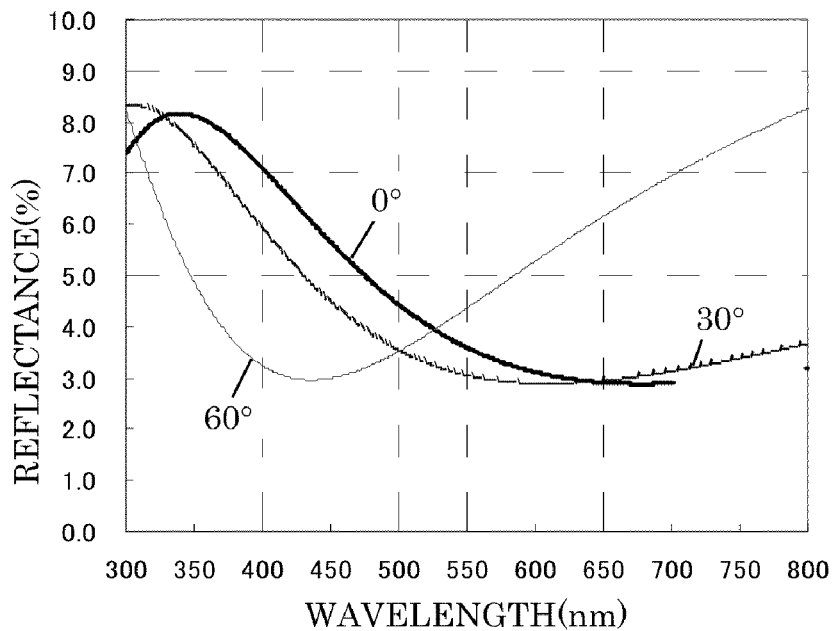
FIG. 17 shows reflectance characteristics of Comparative example 1.

FIG. 17 shows characteristics of this comparative example. FIG. 17 shows reflectance characteristics for light whose incident angles are 0°, 30° and 60°.

This comparative example had a large refractive index difference between the base member and the first layer, and therefore the reflectance was equal to or more than 3% at the entire incident angle range. That is, good reflection suppressing characteristics could not be obtained therefrom.

Comparative Example 2

In this comparative example, optical glass with a refractive index of 1.8 was used as the base member. Then, the first layer was formed with a thickness of 300 nm on the base member. The first layer was made of a material with a refractive index of 1.53, and the material filling factor thereof at part closest to the base member was 70%. The effective refractive index of the first layer was 1.37. The first layer was formed so that the filling factor decreased gradually with increasing proximity to the light-entering side.

Figure 18:
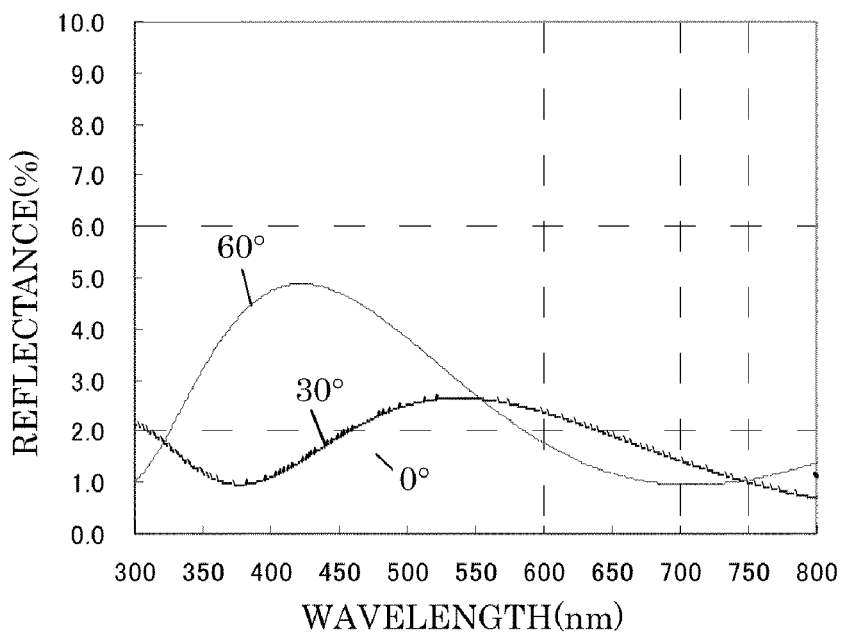
FIG. 18 shows reflectance characteristics of Comparative example 2.

FIG. 18 shows characteristics of this comparative example. FIG. 18 shows reflectance characteristics for light whose incident angles are 0°, 30° and 60°.

This comparative example had a large refractive index difference between the base member and the first layer (grated layer), and therefore the reflectance was increased considerably up to around 5% at a wavelength band of around 400 nm when the incident angle was 60°.

Comparative Example 3

In this comparative example, optical glass with a refractive index of 1.8 was used as the base member. Then, a homogeneous layer (corresponding to the second layer in the embodiment) with a refractive index of 2.3 was formed with a thickness of 50 nm on the base member, and the first layer was formed with a thickness of 300 nm on the homogeneous layer. The first layer was made of a material with a refractive index of 1.53, and the material filling factor thereof at part closest to the base member was 70%. The effective refractive index of the first layer was 1.37. The first layer was formed so that the filling factor decreased gradually with increasing proximity to the light-entering side.

Figure 19:
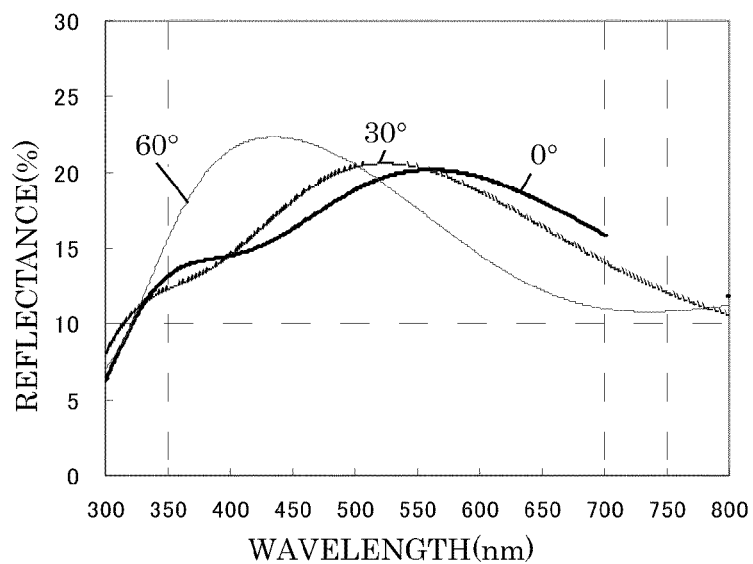
FIG. 19 shows reflectance characteristics of Comparative example 3.

FIG. 19 shows characteristics of this comparative example. FIG. 19 shows reflectance characteristics for light whose incident angles are 0°, 30° and 60°.

In this comparative example, the homogeneous layer did not satisfy the condition (1), and therefore the reflection suppressing characteristics were poor.

Table 1 shows the structures of the above-described Numerical Examples 1 to 4 and Comparative Examples 1 to 3.

TABLE 1

| | | Numerical Ex. 1 | Numerical Ex. 2 | Numerical Ex. 3 | Numerical Ex. 4 | Comparative Ex. 1 | Comparative Ex. 2 | Comparative Ex. 3 |
|---|---|---|---|---|---|---|---|---|
| BASE MEMBER | REFRACTIVE INDEX | 1.8 | 1.5 | 1.8 | 1.8 | 1.8 | 1.8 | 1.8 |
| FIRST LAYER | REFRACTIVE INDEX | 1.46○ | 1.38○ | 1.61○ | 1.64○ | — | — | 2.3X |
| | FILM THICKNESS [nm] | 95○ | 100○ | 85○ | 70○ | — | — | 50○ |
| SECOND LAYER | REFRACTIVE INDEX | — | — | — | 1.53 | — | — | — |
| | FILM THICKNESS [nm] | — | — | — | 25○ | — | — | — |

TABLE 1-continued

|  |  | Numerical Ex. 1 | Numerical Ex. 2 | Numerical Ex. 3 | Numerical Ex. 4 | Comparative Ex. 1 | Comparative Ex. 2 | Comparative Ex. 3 |
|---|---|---|---|---|---|---|---|---|
| OUTERMOST LAYER | EQUIVALENT REFRACTIVE INDEX | 1.13 | 1.13 | 1.37-1.0 | 1.37-1.0 | 1.13 | 1.37-1.0 | 1.37 |
|  | FILM THICKNESS [nm] | 150 | 100 | 300 | 300 | 300 | 300 | 300 |
| CONDITION (1) | REFRACTIVE INDEX | 1.28-1.53 | 1.15-1.40 | 1.42-1.67 | 1.42-1.67 | — | — | 1.42-1.67 |
| CONDITION (2) | FILM THICKNESS [nm] | 47-377 | 50-399 | 43-342 | 42-335 | — | — | 27-217 |
| CONDITION (3) | FILM THICKNESS [nm] | — | — | — | 0-41 | — | — | — |

As described above, the embodiment can realize an optical element having good optical performance such as reflection suppressing performance excellent in broadband characteristics and incident angle characteristics as well as having a high degree of freedom of design.

Furthermore, the present invention is not limited to these embodiments and various variations and modifications may be made without departing from the scope of the present invention.

In the above-stated examples, the reflection suppressing function is obtained by providing the first and second layers on the base member. However, the first and second layers may be provided on the base member for the purpose of obtaining other optical functions.

This application claims the benefit of Japanese Patent Application No. 2007-196745, filed on Jul. 27, 2007, which is hereby incorporated by reference herein in its entirety.

FIELD OF INDUSTRIAL APPLICATION

An optical element having good optical performance such as reflection suppressing performance excellent in broadband characteristics and incident angle characteristics and having a high degree of freedom of design, and an optical apparatus using the same are provided.

The invention claimed is:

1. An optical element comprising in order from a light-entering side:
    a first layer;
    a second layer; and
    a base member,
    wherein the first layer includes a concavo-convex structure with convex portions and concave portions alternately formed at a pitch smaller than a wavelength λ of entering light, and
    wherein the second layer satisfies the following conditions:

$$\sqrt{nb \cdot ns} - 0.15 \leq nA \leq \sqrt{nb \cdot ns} + 0.10$$

$$\frac{\lambda}{8 \cdot nA} \leq dA \leq \frac{\lambda}{nA}$$

where ns represents an effective refractive index of the first layer, nb represents a refractive index of the base member, and nA and dA respectively represent a refractive index and a thickness of the second layer.

2. An optical element according to claim 1, wherein the convex portion and the concave portion change in width in a thickness direction of the first layer, wherein ns represents an effective refractive index of part of the concavo-convex structure, the part being closest to the base member.

3. An optical element according to claim 1 or 2, further comprising a third layer disposed between the first layer and the second layer, the third layer satisfying the following condition:

$$0 < dB \leq \frac{\lambda}{5 \cdot nB}$$

where nB and dB respectively represent a refractive index and a thickness of the third layer.

4. An optical element according claim 1 or 2, wherein the first layer and a layer adjacent to the first layer include mutually different materials.

5. An optical apparatus, comprising:
    an optical element according to claim 1 or 2.

6. An optical element according to claim 3, wherein the first layer and a layer adjacent to the first layer include mutually different materials.

7. An optical apparatus, comprising:
    an optical element according to claim 3.

8. An optical apparatus, comprising:
    an optical element according to claim 4.

9. An optical apparatus, comprising:
    an optical element according to claim 6.

* * * * *